Oct. 3, 1961           N. C. MOORE           3,002,256
ELECTRICAL CAPACITORS
Filed March 4, 1959
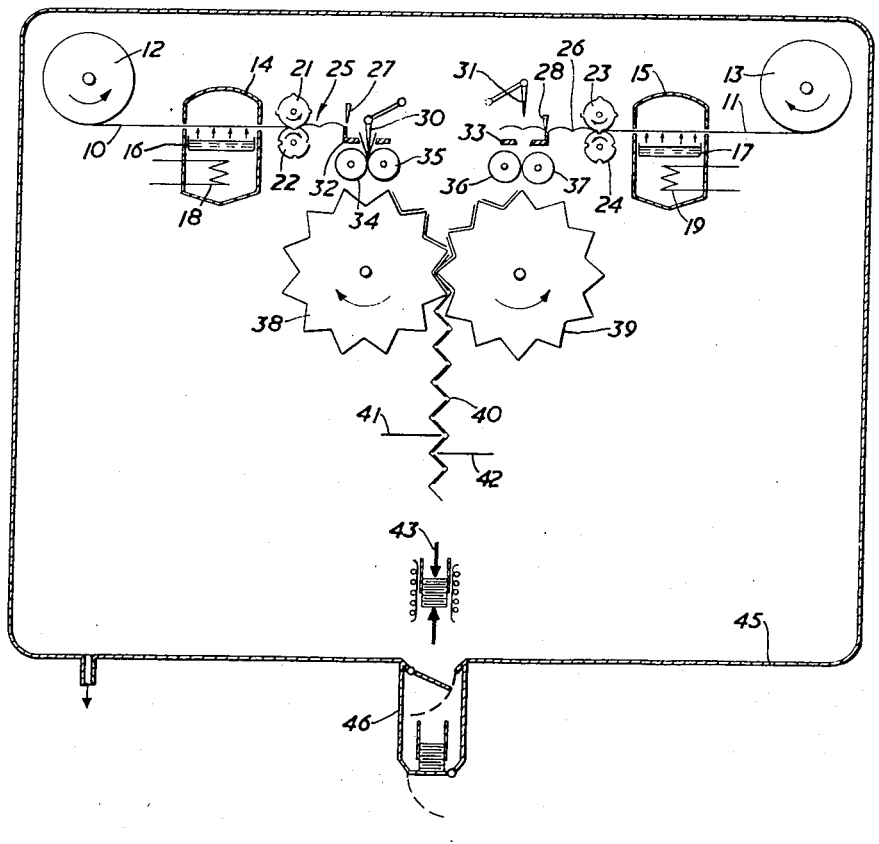

3,002,256
ELECTRICAL CAPACITORS
Norman C. Moore, Greens Norton, England, assignor to The Plessey Company Limited, Ilford, England, a British company
Filed Mar. 4, 1959, Ser. No. 797,305
8 Claims. (Cl. 29—25.42)

This invention relates to electrical capacitors and has for its object to provide an improved method of manufacturing such capacitors.

In the manufacture of electrical capacitors in quantity it is very desirable that there should be as high a degree of mechanisation as possible. In the manufacture of capacitors of other than the smallest capacitance a substantial obstacle to the use of a high degree of automatic operation arises from the need of a substantial area of electrodes and dielectric material, and to reduce this material to a compact form. Capacitors can be made with one or a very few layers of dielectric materials of very high permittivity to avoid this need, but the invention is not concerned with capacitors of this latter type, which have certain attendant disadvantages.

Customarily capacitors of the former kind are manufactured by winding an assembly of strips of dielectric material into rolls, together with conductive elements or layers which provide the electrodes of the capacitor. The manufacture of capacitors in this way is a complicated process involving a series of discrete steps and the process is accordingly lengthy and costly. The reasons for this are that the winding of the capacitor elements cannot conveniently be carried out as a continuous process, since it is necessary to start and stop winding repeatedly and the provision of electrodes, terminals for the electrodes and, as is usually desired, the impregnation of the elements cannot easily be carried out continuously. This is especially so with impregnation as with normal process the impregnation time is very much longer than the time required to effect the other steps of manufacture.

The present invention is concerned with the process of manufacture of electrical capacitors in which a more continuous and, it may be, a more automatic process of manufacture can be obtained.

In a method of manufacture in accordance with the invention the capacitor elements are made by interleaving folded elements of dielectric material alternately from opposite directions, together with suitable electrode means, the process being carried out at a substantially reduced pressure. The elements thus made are maintained at low pressure and are provided with terminals and are impregnated or sealed whilst continuing under low pressure.

Other features and advantages of the invention will appear from the following description of one embodiment thereof given by way of example, in conjunction with the accompanying drawing, which is a schematic diagram showing the general arrangement of an apparatus for carrying out the process of the invention.

The apparatus which is shown in this drawing produces a capacitor which is generally similar to one described in our co-pending U.S.A. application No. 710,381/58, now abandoned, and the apparatus itself is similar in some respects. It is convenient to refer to the specification of U.S.A. application No. 710,381/58 now abandoned for a more detailed description of the capacitor and the apparatus, but, briefly, a capacitor is made from strips of dielectric material such as paper or polystyrene; if paper is used the paper can be lacquered to improve its dielectric properties. To one side of each strip is applied a conducting layer of metal such as zinc or aluminum, the deposit or foil can extend up to both edges of the dielectric strips but it is preferred to leave marginal uncoated portions, to increase the insulation resistance of the finished capacitor.

The coated dielectric strip is cut into short lengths by straight transverse cuts.

Two series of these elements are alternately interleaved from opposite directions in the manner shown in FIGURE 3 of the drawings of U.S.A. specification No. 710,381/58, now abandoned.

An apparatus is shown in the accompanying drawing for making the elements from continuous strips of dielectric material, applying a metal coating to the strips, cutting them into elements, interleaving the elements, applying terminal leads to the elements and sealing the capacitors thus made.

In this apparatus, strips 10, 11 of dielectric material are fed from reels 12, 13, through metallising chambers 14, 15. In these chambers metal, such as zinc or aluminum, in crucibles 16, 17 is heated and evaporated by electric heaters 18, 19 and is deposited upon the strips as they pass through the chambers.

After leaving the chambers 14, 15, the strips pass respectively between two pairs of rollers 21, 22 and 23, 24. Rollers 21 and 23 have projections upon them and rollers 22 and 24 are either soft-faced, or have corresponding recesses, as shown, to the effect that the strips are notched slightly, at regular intervals, as at 25, 26.

The strips are fed to shears 27, 28, the operations of the shear knives being so timed that cuts are made at alternate notches, each element cut off having a notch in the centre. The cut elements are then engaged by pushers 30, 31; the pushers are in the form of blades which engage the notches and push the elements in doubled form through folding plates 32, 33, and into the nip of pairs of compression rollers 34, 35 and 36, 37.

The apparatus by which interleaving is obtained, comprises a pair of toothed wheels 38, 39; the cut lengths of dielectric material drop from the rollers 34, 35 and 36, 37 into a space between adjacent teeth of the two wheels and are held there by suction. The two toothed wheels 38, 39 rotate in opposite directions and the teeth inter-engage sufficiently to cause the strips to be interleaved in the desired manner. When thus interleaved, suction on the teeth is released and a stack of elements emerges from the wheels at 40. Means are also provided for inserting electrode strips 41, 42 at the end of a desired length of stack of the elements, appropriate to the desired capacity.

With the present invention the length of stacks, corresponding to the individual capacitors, are removed from the interleaving machine and are fed automatically to a compressing mechanism at 43, where the stacks of elements are compressed and simultaneously heated; with the present invention it becomes practicable to effect sealing of the capacitors at this stage.

Normally, the process of impregnation of capacitors of the type with which the invention is concerned is a lengthy one. This is due to the fact that the capacitors must be subjected to vacuum for a substantial time in order to extract any air which may be trapped or entrained within the capacitor. Any such air within the capacitor can lead to a void when the impregnant is applied, and such a void introduces a danger of breakdown at that point. The practice is therefore usually to treat a substantial number of capacitors simultaneously in batch treatment. It will be obvious that the need to carry out the impregnation stage intermittently prohibits a continuous operation.

With the present invention it becomes possible to avoid this difficulty, by operating the apparatus described at low pressure. A vacuum enclosure indicated diagrammatically at 45 is used to maintain the requisite degree of vacuum, established by a pumping system connected to the outlet 46. By maintaining this low pressure, the danger of entrapping air within the capacitor is very substantially reduced and any air adsorbed initially in the materials used is extracted as the process continues.

Sealing can accordingly be carried out as soon as the stack of elements is compressed, and it is advantageous if the sealing is carried out within the enclosure 45. Sealing can be effected by an impregnation medium, but preferably the material of the dielectric can be chosen so that sealing is completed during the pressing and heating that takes place at 43. For example, the dielectrical material can be a thermoplastic, such as the polystyrene mentioned above or it may consist of a non-thermoplastic material which has applied to it either a thermoplastic coating or a heat curable resin. With this provision the sealing of the capacitor can be effected merely by passing the capacitor assemblies between heated platens.

In any event, the major advantage of the present invention can be realised only if the sealing, and impregnation if incorporated, is effected without permitting the capacitor assembly to be subjected to air at normal pressure after it is assembled and before it is sealed.

If the capacitor assemblies are sealed without impregnation, it may be advantageous to dip seal them by a further coating.

Mention has been made above of the retention of the elements upon the toothed wheels by which they are interleaved, by the use of suction. If the apparatus is at very low pressure it will be clear that the pressure differential which retains the elements in position will be reduced and at this stage it may be desirable to use a slightly higher pressure in the apparatus in order to sustain an adequate pressure differential.

The sealed capacitors can be removed from the enclosure 45 through an airlock chamber 46.

The apparatus described can be modified in various ways. For example, it is advantageous to arrange that the ends of the elements are free of metallising, in the manner described in our co-pending British application No. 32,914/57, by avoiding the deposition of the metal upon the dielectric strip at the appropriate points, or by removing the metal coating after it has been deposited.

It is also advantageous to arrange a further pair of rollers beneath each of the pairs of rollers 34, 35 and 36, 37, in the manner described in our co-pending British application No. 32,913/57, in order to ensure that the folded elements drop accurately in the space of the wheels 38, 39.

In place of a single chamber 45 as described, there can be used a series of chambers all maintained at low pressure.

What we claim is:

1. A continuous method of manufacturing electrical capacitors which comprises applying by vacuum depositioning a first conductive layer to the surface of a first strip of flexible dielectric material, and a second conductive layer to the surface of a second strip of flexible dielectric material, feeding the coated first and second strips through first and second apparatus for cutting the strips into elements of a predetermined length, folding each element into a V-shape, interleaving said elements to form a continuous length thereof, compressing a predetermined number of interleaved elements into a unit, sealing the interleaved elements of the unit by the application of heat and maintaining the strip material before and after the coating thereof, and during the folding, interleaving and sealing at a low pressure.

2. A continuous method of manufacturing electrical capacitors which comprises applying a first conductive layer to a surface of a first strip of flexible dielectric material, applying a second conductive layer on a surface of a second strip of dielectric material, each conductive layer being applied to the associated strip by a vacuum depositioning, maintaining the strips before and after the depostioning at a low pressure, folding each strip whilst at said low pressure into a series of V shaped elements, alternately interleaving the elements from each strip to form a continuous length of interleaved elements whilst maintaining said low pressure, compressing the interleaved elements whilst at said low pressure into units including a predetermined number of interleaved elements, and sealing the units by the application of heat whilst maintaining the units at said low pressure until they have been sealed.

3. A continuous method of manufacturing electrical capacitors comprising applying a first conductive layer on a first strip of flexible dielectric material, applying a second conductive layer on a second strip of dielectric material, each conductive layer being applied to the associated strip by a vacuum depositioning, maintaining the strips before and after the depositioning at a low pressure, folding each strip whilst at said low pressure into a series of V shaped elements, applying heat curable synthetic resin to the elements whilst maintaining said low pressure, alternately interleaving the elements at said low pressure of each series to form a continuous length of interleaved elements, compressing the interleaved elements whilst at said low pressure into units including a predetermined number of elements and sealing the units by the application of heat and simultaneously maintaining the units at said low pressure until they have been sealed.

4. A continuous method of manufacturing electrical capacitors which comprises applying by vacuum depositioning a first conductive layer on a first strip of flexible dielectric material, applying a second conductive layer on a second strip of flexible dielectric material, feeding the first and second strips through first and second apparatus for cutting and folding the strips into V shaped elements of a predetermined length, interleaving said elements to form a continuous length of interleaved elements, compressing a predetermined number of elements of the continuous length into a capacitor unit, inserting terminal means between predetermined elements, sealing the interleaved elements by the application of heat and maintaining the strip material before and after the vacuum depositioning and the elements during their folding and sealing at a low pressure.

5. A continuous method of manufacturing electrical capacitors which comprises applying by vacuum depositioning a first conductive layer on a first strip of flexible dielectric material, applying a second conductive layer on a second strip of flexible dielectric material, feeding the first and second strips through first and second apparatus for cutting and folding the strips into two series of V shaped elements of a predetermined length, applying heat curable synthetic resin to the elements, alternately interleaving the elements of each series to form a continuous length of individual elements, compressing a predetermined number of elements of the continuous length into a capacitor unit, inserting terminal elements, sealing the interleaved elements of the unit by the application of heat and maintaining the strip material before and after the vacuum depositioning and the elements during their folding, coating with resin and sealing at a low pressure.

6. A continuous method of manufacturing electrical capacitors which comprises applying by vacuum depositioning conductive layers on a strip of flexible dielectric material, applying a second conductive layer on a second strip of flexible dielectric material, feeding the first and second strips through first and second apparatus for cutting and folding the strips into two series of V shaped elements of a predetermined length, interleaving said elements to form a continuous length of individual element, compressing a predetermined number of elements into a capacitor unit, sealing the interleaved elements by the application of heat, maintaining the strip material and the elements during their folding, compressing and sealing at a low pressure, and applying a further protective coating after the elements have been sealed.

7. A continuous method of manufacturing electrical capacitors which comprise applying by vacuum depositioning a first conductive layer on a first strip of flexible dielectric material and a second conductive layer on a second strip of flexible dielectric material, feeding the first and second strips through first and second apparatus for cutting and folding the strips into two separate series of V shaped elements of a predetermined length, applying heat curable synthetic resin to the elements, alternately interleaving said elements of each series to form a continuous length of individual elements, compressing a predetermined number of elements into a capacitor unit, inserting terminal elements, sealing the interleaved elements of the unit by the application of heat and maintaining the strip material before and after vacuum depositioning and the elements during their folding, coating with resin and sealing at a low pressure, and applying a further protective coating after the elements have been sealed.

8. Apparatus for the continuous production of electrical capacitors comprising first and second vacuum depositioning means, means for feeding first and second strips of dielectric material to the first and second depositioning means respectively, means for cutting and folding each strip into a series of V shaped elements, means for alternately interleaving the elements of each series to form a continuous length of interleaved elements, means for compressing a predetermined number of interleaved elements into separate units, means for sealing the units and means for maintaining the strip material before and after vacuum depositioning and during the cutting, interleaving and sealing at a low pressure.

References Cited in the file of this patent

UNITED STATES PATENTS 2,882,586     Shen ------------------ Apr. 21, 1959

FOREIGN PATENTS 620,405     Great Britain ---------- Mar. 24, 1949